US012785761B2

(12) United States Patent
Choi

(10) Patent No.: US 12,785,761 B2
(45) Date of Patent: Nov. 3, 2026

(54) METHOD AND APPARATUS FOR TRANSMITTING REFERENCE SIGNAL IN MULTI-ANTENNA SYSTEM

(71) Applicant: Industry-Academic Cooperation Foundation, Dankook University, Yongin-si (KR)

(72) Inventor: Suhan Choi, Gwacheon-si (KR)

(73) Assignee: Industry-Academic Cooperation Foundation, Dankook University, Yongin-si (KR)

( * ) Notice: Subject to any disclaimer, the term of this patent is extended or adjusted under 35 U.S.C. 154(b) by 263 days.

(21) Appl. No.: 18/699,304

(22) PCT Filed: Oct. 21, 2022

(86) PCT No.: PCT/KR2022/016146

§ 371 (c)(1),
(2) Date: Apr. 8, 2024

(87) PCT Pub. No.: WO2023/068868

PCT Pub. Date: Apr. 27, 2023

(65) Prior Publication Data

US 2024/0396594 A1 Nov. 28, 2024

(30) Foreign Application Priority Data

Oct. 22, 2021 (KR) ........................ 10-2021-0141612
Oct. 20, 2022 (KR) ........................ 10-2022-0135655

(51) Int. Cl.

| | |
|---|---|
| ***H04B 7/04*** | (2017.01) |
| ***H04B 7/0413*** | (2017.01) |
| ***H04B 7/06*** | (2006.01) |

(52) U.S. Cl.
CPC ......... *H04B 7/0413* (2013.01); *H04B 7/0626* (2013.01); *H04B 7/0632* (2013.01)

(58) Field of Classification Search
CPC .. H04B 7/0413; H04B 7/0626; H04B 7/0632; H04B 7/041; H04B 7/062; H04B 7/063; H04W 72/232; H04W 72/0446; H04W 72/1263; H04W 72/23; H04W 72/044
See application file for complete search history.

(56) References Cited

U.S. PATENT DOCUMENTS

| | | | | |
|---|---|---|---|---|
| 9,572,063 | B2 * | 2/2017 | Etemad | H04L 41/082 |
| 2018/0020441 | A1 * | 1/2018 | Lo | H04W 40/244 |
| 2022/0052734 | A1 * | 2/2022 | Faxer | H04B 7/0478 |
| 2023/0006762 | A1 * | 1/2023 | Levitsky | H04L 1/0025 |

FOREIGN PATENT DOCUMENTS

| | | | |
|---|---|---|---|
| KR | 10-2013-0127952 | A1 | 11/2013 |
| KR | 10-2017-0108422 | A | 9/2017 |
| KR | 10-1971801 | B1 | 4/2019 |
| KR | 10-2021-0119824 | A | 10/2021 |
| WO | 2016-200106 | A | 12/2016 |

* cited by examiner

*Primary Examiner* — Wei Zhao
(74) *Attorney, Agent, or Firm* — INVENSTONE PATENT, LLC

(57) ABSTRACT

The LoS MIMO system may be applied to all frequency bands used in general mobile communications. In particular, the LoS MIMO system is very important in high frequency bands (e.g., 10 GHz to 100 GHz, or hundreds of GHz or tera-Hz). Accordingly, the present disclosure proposes a method and apparatus for designing signals and resources in a LoS MIMO system applicable to next generation wireless communication systems.

12 Claims, 10 Drawing Sheets

(a)

(b)

METHOD AND APPARATUS FOR TRANSMITTING REFERENCE SIGNAL IN MULTI-ANTENNA SYSTEM

CROSS-REFERENCE TO RELATED APPLICATIONS

This application is a National Stage filing under 35 U.S.C. 371 of International Application No. PCT/KR2022/016146, filed on Oct. 21, 2022, which claims the benefit of earlier filing date and right of priority to Korean Application No. 10-2021-0141612, filed on Oct. 22, 2021 and Korean Application No. 10-2022-0135655, filed on Oct. 20, 2022 in the Korean Intellectual Property Office, the contents of which are all hereby incorporated by reference herein in their entirety.

BACKGROUND OF THE DISCLOSURE

Technical Field

The present disclosure relates to wireless communication, and more specifically, to a method and apparatus for transmitting a reference signal in a multi-antenna system.

Background Art

As smartphones and IoT (Internet of Things) terminals rapidly spread, the amount of information exchanged through communication networks is increasing. Accordingly, it is necessary to consider an environment for providing faster services to more users than existing communication systems (or existing radio access technology) (e.g., enhanced mobile broadband communication) in the next-generation wireless access technology. To this end, a communication system considering machine type communication (MTC) for providing services by connecting multiple devices and objects is being developed. In addition, a communication system (e.g., ultra-reliable and low latency communication (URLLC)) that takes into account services and/or terminals sensitive to communication reliability and/or latency is being developed.

SUMMARY OF THE DISCLOSURE

A method for designing signals and resources is required in a line-of-sight (LoS) MIMO system applicable to next-generation wireless communication systems.

The present disclosure proposes a method and apparatus for designing signals and resources in a LoS MIMO system applicable to next-generation wireless communication systems.

Specifically, according to one embodiment, provided is a method performed by a user equipment (UE) in a wireless communication system supporting Line of Sight (LoS) Multiple Input Multiple Output (MIMO), The method comprises receiving a reference signal related to the LoS MIMO from a base station; and decoding the reference signal related to the LoS MIMO, wherein the LoS MIMO is MIMO supporting multiple layers-based transmission and reception based on a line of sight, wherein the reference signal related to the LoS MIMO is at least one of a channel state information-reference signal (CSI-RS) and a demodulation reference signal (DM-RS), and wherein the reference signal related to the LoS MIMO is transmitted through a LoS MIMO-specific resource.

According to another embodiment, provided is a user equipment (UE) in a wireless communication system supporting Line of Sight (LoS) Multiple Input Multiple Output (MIMO) comprising at least one memory storing instructions; at least one transceiver; and at least one processor configured to connect the at least one memory and the at least one transceiver, wherein the at least one processor executes the instructions to: receive a reference signal related to the LoS MIMO from a base station; and decode the reference signal related to the LoS MIMO, wherein the LoS MIMO is MIMO supporting multiple layers-based transmission and reception based on a line of sight, wherein the reference signal related to the LoS MIMO is at least one of a channel state information-reference signal (CSI-RS) and a demodulation reference signal (DM-RS), wherein a LoS MIMO-specific antenna port number is allocated to the reference signal related to the LoS MIMO, and wherein the reference signal related to the LoS MIMO is transmitted through a LoS MIMO-specific resource.

According to another embodiment, provided is a method performed by a user equipment (UE) in a wireless communication system supporting Line of Sight (LoS) Multiple Input Multiple Output (MIMO). The method comprises generating a reference signal related to the LoS MIMO; and transmitting the reference signal related to the LoS MIMO to a base station, wherein the LoS MIMO is MIMO supporting multiple layers-based transmission and reception based on a line of sight, wherein the reference signal related to the LoS MIMO is at least one of a channel state information-reference signal (CSI-RS) and a demodulation reference signal (DM-RS), wherein a LoS MIMO-specific antenna port number is allocated to the reference signal related to the LoS MIMO, and wherein the reference signal related to the LoS MIMO is transmitted through a LoS MIMO-specific resource.

When performing a communication based on MIMO, data transmission rate may be increased/improved by generating multiple layers in a LoS environment, according to the present disclosure.

DETAILED DESCRIPTION OF THE DISCLOSURE

Figure 1:
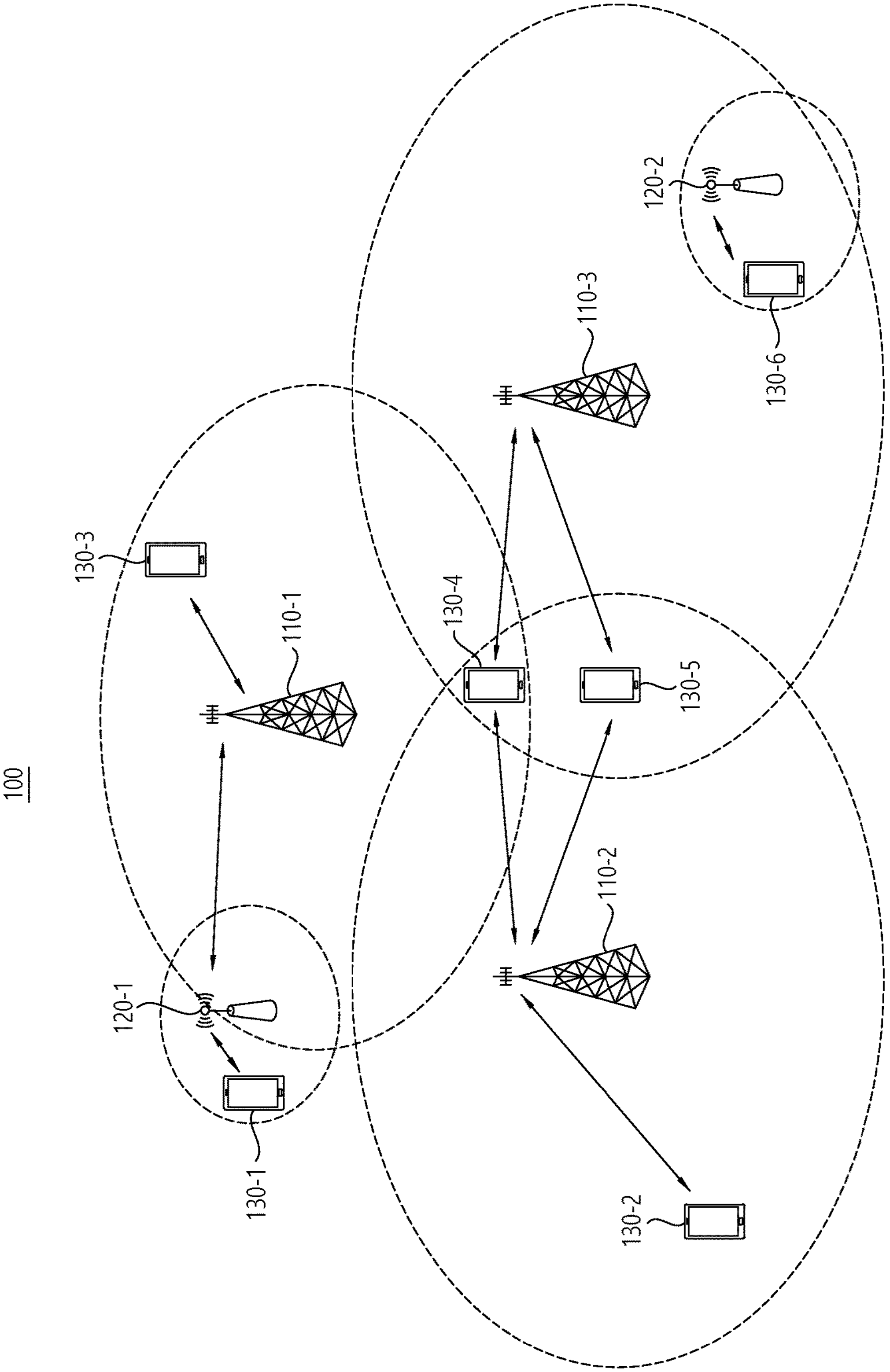
FIG. 1 is a conceptual diagram showing a wireless communication system according to an embodiment of the present disclosure.

Since the present disclosure can make various changes and have various embodiments, specific embodiments will be illustrated in the drawings and described in detail in the detailed description. However, this is not intended to limit the present disclosure to specific embodiments and should be understood to include all changes, equivalents, and substitutes included in the spirit and technical scope of the present disclosure. In description of the drawings, similar reference numerals are used for similar components.

While terms, such as "first", "second", "A", "B", etc., may be used to describe various components in the present disclosure, such components must not be limited by the above terms. The above terms are used only to distinguish one component from another. For example, a first component may be referred to as a second component, and similarly, the second component may be referred to as the first component without departing from the scope of the present disclosure. The term "and/or" also includes any of a plurality of related stated items or a combination of a plurality of related stated items.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The terms used in the present disclosure are merely used in order to describe particular embodiments, and are not intended to limit the scope of the present disclosure. An element described in the singular form is intended to include a plurality of elements unless the context clearly indicates otherwise. In the present disclosure, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, preferred embodiments according to the present disclosure will be described in detail with reference to the attached drawings.

FIG. 1 is a conceptual diagram showing a wireless communication system according to an embodiment of the present disclosure.

Referring to FIG. 1, the wireless communication system 100 may include a plurality of communication nodes 110-1, 110-2, 110-3, 120-1, 120-2, 130-1, 130-2, 130-3, 130-4, 130-5, and 130-6.

Each of the plurality of communication nodes may support at least one communication protocol. For example, each of the plurality of communication nodes may support a communication protocol based on code division multiple access (CDMA), a communication protocol based on wideband CDMA (WCDMA), a communication protocol based on time division multiple access (TDMA), a communication protocol based on frequency division multiple access (FDMA), a communication protocol based on orthogonal frequency division multiplexing (OFDM), a communication protocol based on orthogonal frequency division multiple access (OFDMA), a communication protocol based on single carrier (SC)-FDMA, a communication protocol based on non-orthogonal multiple access (NOMA), a communication protocol based on space division multiple access (SDMA), etc.

The wireless communication system 100 may include a plurality of base stations 110-1, 110-2, 110-3, 120-1, and 120-2 and a plurality of user equipments (UEs) 130-1, 130-2, 130-3, 130-4, 130-5, and 130-6.

Each of the first base station 110-1, the second base station 110-2, and the third base station 110-3 may form a macro cell. Each of the fourth base station 120-1 and the fifth base station 120-2 may form a small cell. The fourth base station 120-1, the third UE 130-3, and the fourth UE 130-4 may belong to the coverage of the first base station 110-1. The second UE 130-2, the fourth UE 130-4, and the fifth UE 130-5 may belong to the coverage of the second base station 110-2. The fifth base station 120-2, the fourth UE 130-4, the fifth UE 130-5, and the sixth UE 130-6 may belong to the coverage of the third base station 110-3. The first UE 130-1 may belong to the coverage of the fourth base station 120-1. The sixth UE 130-6 may belong to the coverage of the fifth base station 120-2.

Here, each of the plurality of base stations 110-1, 110-2, 110-3, 120-1, and 120-2 may be referred to as a NodeB, an evolved NodeB, a next generation Node B (gNB), a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), a relay node, or the like. Each of the plurality of UEs 130-1, 130-2, 130-3, 130-4, 130-5 and 130-6) may be referred to as a terminal, an access terminal, a mobile terminal, a station, a subscriber station, a mobile station, a portable subscriber station, a node, a device, or the like.

Each of the plurality of communication nodes 110-1, 110-2, 110-3, 120-1, 120-2, 130-1, 130-2, 130-3, 130-4, 130-5, and 130-6 may support cellular communication (e.g., long term evolution (LTE), LTE-advanced (LTE-A), New Radio (NR), etc. specified in the 3rd generation partnership project (3GPP) standard). The plurality of base stations 110-1, 110-2, 110-3, 120-1, and 120-2 may operate in different frequency bands or may operate in the same frequency band. The plurality of base stations 110-1, 110-2, 110-3, 120-1, and 120-2) may be connected to each other through ideal backhaul or non-ideal backhaul and may exchange information through the ideal backhaul or non-ideal backhaul. Each of the plurality of base stations 110-1, 110-2, 110-3, 120-1, and 120-2 may be connected to a core network (not shown) through ideal backhaul or non-ideal backhaul. Each of the plurality of base stations 110-1, 110-2, 110-3, 120-1, and 120-2 may transmit a signal received from the core network to the corresponding UE 130-1, 130-2, 130-3, 130-4, 130-5, or 130-6) and transmit a signal received from the corresponding UE 130-1, 130-2, 130-3, 130-4, 130-5, or 130-6 to the core network. can be transmitted to.

Each of the plurality of base stations 110-1, 110-2, 110-3, 120-1, and 120-2 may support downlink transmission based on OFDM or other transmission schemes. In addition, each of the plurality of base stations 110-1, 110-2, 110-3, 120-1, and 120-2 may support uplink transmission based on OFDM, DFT-Spread-OFDM or other transmission schemes. In addition, each of the plurality of base stations 110-1, 110-2, 110-3, 120-1, and 120-2 may support Multiple Input Multiple Output (MIMO) (e.g., Single User (SU)-MIMO, MU (Multi User)—MIMO, massive MIMO, LoS MIMO, etc.), coordinated multipoint (CoMP) transmission, carrier aggregation transmission, transmission in unlicensed bands, device to device (D2D) communication (or proximity services (ProSe)), sidelink, etc. Here, the plurality of UEs 30-1, 130-2, 130-3, 130-4, 130-5, and 130-6) may perform operations corresponding to the base stations 110-1, 110-2, 110-3, 120-1, and 120-2) and/or operations supported by the base stations 110-1, 110-2, 110-3, 120-1, and 120-2.

For example, the second base station 110-2 may transmit a signal to the fourth UE 130-4 through SU-MIMO or LoS MIMO, and the fourth UE 130-4 may receive the signal from the second base station 110-2 through SU-MIMO or LoS MIMO. Alternatively, the second base station 110-2 may transmit a signal to the fourth UE 130-4 and the fifth UE 130-5 through MU-MIMO, and the fourth UE 130-4 and the fifth UE 130-5 may receive the signal from the second base station 110-2 through MU-MIMO. Each of the first base station 110-1, the second base station 110-2, and the third base station 110-3 may transmit a signal to the fourth UE 130-4 through CoMP, and the fourth terminal 130-4 may receive signals from the first base station 110-1, the second base station 110-2, and the third base station 110-3 through CoMP. Each of the plurality of base stations 110-1, 110-2, 110-3, 120-1, and 120-2 may transmit/receive signals to/from UEs 130-1, 130-2, 130-3, 130-4, 130-5, and 130-6 belonging to the coverage thereof through CA.

The first base station 110-1, the second base station 110-2, and the third base station 110-3 may coordinate D2D communication between the fourth UE 130-4 and the fifth UE 130-5, and the fourth UE 130-4 and the fifth UE 130-5 may perform D2D communication according to coordination of the second base station 110-2 and the third base station 110-3.

Hereinafter, even when a method performed in a first communication node among communication nodes (e.g., transmission or reception of a signal) is described, a second communication node may perform a method (e.g., reception or transmission of a signal) corresponding to the method performed in the first communication node. That is, in a case where the operation of a UE is described, the base station corresponding thereto can perform the operation corresponding to the operation of the UE. On the other hand, in a case where the operation of a base station is described, the UE corresponding thereto can perform the operation corresponding to the operation of the base station.

Further, hereinafter, downlink (DL) refers to communication from a base station to a UE, and uplink (UL) refers to communication from a UE to a base station. On downlink, a transmitter may be a part of a base station and a receiver may be a part of a UE. On uplink, the transmitter may be a part of a UE and the receiver may be a part of a base station.

Recently, as smartphones and IoT (Internet of Things) terminals have rapidly spread, the amount of information exchanged through communication networks is increasing. Accordingly, it is necessary to consider an environment for providing faster services to more users than existing communication systems (or existing radio access technology) (e.g., enhanced mobile broadband communication) in the next-generation wireless access technology. To this end, design of a communication system considering machine type communication (MTC) for providing services by connecting multiple devices and objects is under discussion. In addition, design of a communication system (e.g., ultra-reliable and low latency communication (URLLC)) that takes into account services and/or terminals sensitive to communication reliability and/or latency is also under discussion.

Hereinafter, in this specification, for convenience of description, the next-generation wireless access technology may be referred to as New RAT (Radio Access Technology) or other names. For example, a wireless communication system to which New RAT is applied may be referred to as a NR (New Radio) system. In this specification, frequencies, frames, subframes, resources, resource blocks, regions, bands, subbands, control channels, data channels, synchronization signals, various reference signals, various signals, or various messages related to next-generation wireless access technology may be interpreted as various meanings used in the past, present, or in the future.

Figure 2:
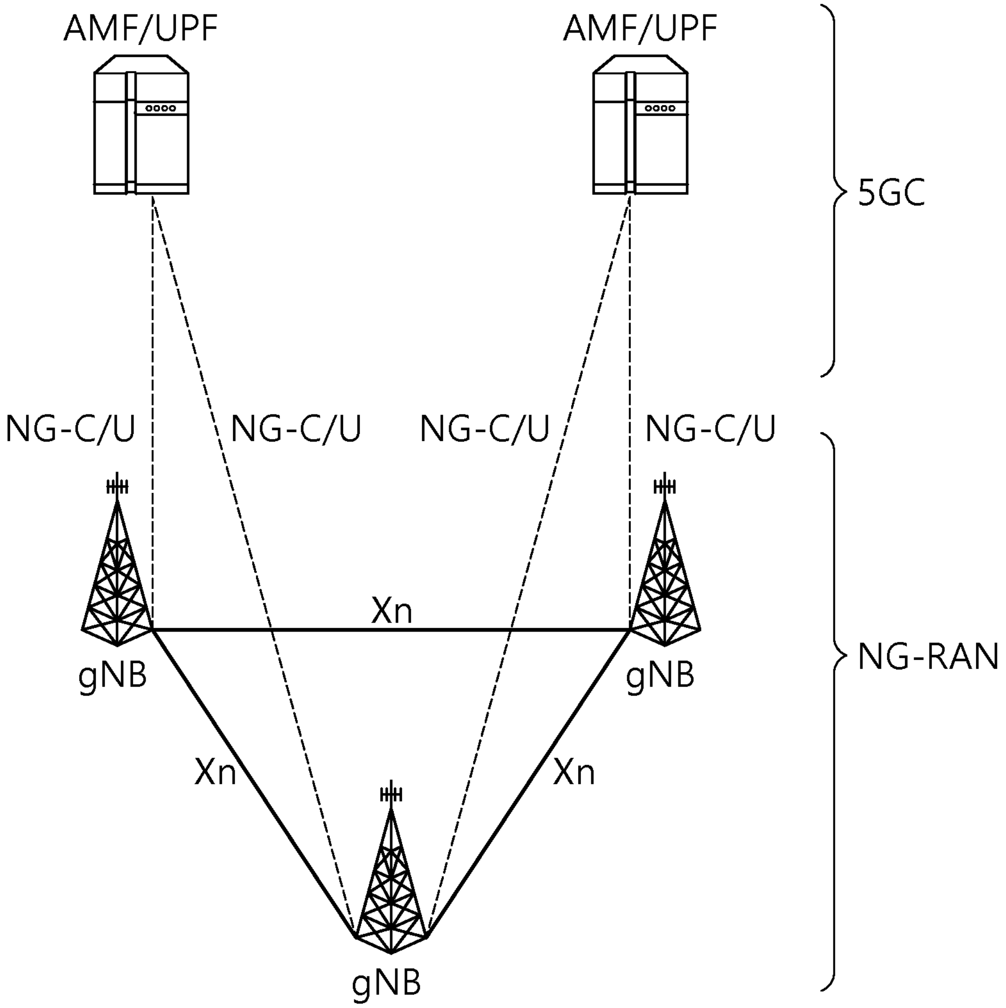
FIG. 2 is an exemplary diagram showing a 3GPP 5G system to which a data transmission method according to an embodiment of the present disclosure is applicable.

FIG. 2 is an exemplary diagram showing an NR system to which a data transmission method according to an embodiment of the present disclosure is applicable.

5G NR, wireless communication technology currently in the process of being standardized in 3GPP, is wireless access technology that provides an improved data transmission rate compared to LTE E-UTRA and can satisfy various QoS requirements required for each segmented and specific usage scenario. In particular, enhanced mobile broadband (eMBB), massive MTC (mMTC), and ultra reliable and low latency communications (URLLC) were defined as representative usage scenarios of 5G NR. As a method for satisfying requirements of each scenario, a frame structure flexible as compared to LTE E-UTRA is provided. The frame structure of 5G NR supports a frame structure based on multiple subcarriers. A default subcarrier spacing (SCS) is 15 kHz, and a total of 5 types of SCS are supported as 15 kHz*2^n (n=0, 1, 2, 3, 4).

Referring to FIG. 2, next generation-radio access network (NG-RAN) includes gNBs that provide protocol termination of an NG-RAN user plane (SDAP/PDCP/RLC/MAC/PHY) and a control plane (RRC) protocol for UE. Here, NG-C represents a control plane interface used for an NG2 reference point between the NG-RAN and a 5th generation core (5GC). NG-U represents a user plane interface used for an NG3 reference point between the NG-RAN and the 5GC.

gNBs are interconnected through an Xn interface and connected to the 5GC through an NG interface. More specifically, the gNB is connected to an access and mobility management function (AMF) through the NG-C interface and connected to a user plane function (UPF) through the NG-U interface.

In the NR system of FIG. 2, multiple numerologies can be supported. Here, the numerology can be defined by a subcarrier spacing and cyclic prefix (CP) overhead. At this time, multiple subcarrier spacings can be derived by scaling the default subcarrier spacing to an integer. Additionally, although it is assumed that a very low subcarrier spacing is not used at a very high carrier frequency, the numerology used may be selected independently of the frequency band.

Additionally, in the NR system, various frame structures according to multiple numerologies can be supported.

<NR Waveform, Numerology and Frame Structure>

In NR, a CP-OFDM waveform using a cyclic prefix is used for downlink transmission, and CP-OFDM or DFT-S-OFDM is used for uplink transmission. OFDM is easily combined with Multiple Input Multiple Output (MIMO) and has the advantages of high frequency efficiency and being able to use a low-complexity receiver.

Meanwhile, in NR, requirements for a data rate, a delay rate, coverage, and the like are different for each of the three scenarios described above, and thus it is necessary to efficiently satisfy the requirements for each scenario through the frequency band that constitutes an arbitrary NR system. To this end, a technology for efficiently multiplexing radio resources based on a plurality of different numerologies has been proposed.

Specifically, an NR transmission numerology is determined based on a subcarrier spacing and a cyclic prefix (CP), and as shown in Table 1 below, value μ is used as an exponent value of 2 based on 15 kHz, resulting in exponential change.

TABLE 1

| μ | Subcarrier spacing (kHz) | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1 above, NR numerology can be divided into five types depending on the subcarrier spacing. This is different from the subcarrier spacing of LTE E-UTRA, one of the 4G communication technologies, which is fixed to 15 kHz. Specifically, subcarrier spacings used for data transmission in NR are 15, 30, 60, and 120 kHz, and subcarrier spacings used for synchronization signal transmission are 15, 30, 120, and 240 kHz. Additionally, an extended CP is applied only to the 60 kHz subcarrier spacing. Meanwhile, the frame structure in NR is defined as a frame with a length of 10 ms consisting of 10 subframes with the same length of 1 ms. One frame can be divided into half-frames of 5 ms, and each half-frame includes 5 subframes. In the case of 15 kHz subcarrier spacing, one subframe consists of 1 slot, and each slot consists of 14 OFDM symbols in the case of normal CP and 12 OFDM symbols in the case of extended CP.

<NR Physical Resources>

Regarding physical resources in NR, an antenna port, a resource grid, a resource element, a resource block, a bandwidth part, etc. are considered.

An antenna port is defined such that a channel carrying a symbol on the antenna port can be inferred from a channel carrying another symbol on the same antenna port. If large-scale properties of a channel carrying a symbol on one antenna port can be inferred from a channel carrying a symbol on another antenna port, it can be said that the two antenna ports are in a quasi-co-location (QC/QCL) relationship. Here, the large-scale properties include one or more of delay spread, Doppler spread, Doppler shift, average delay, and spatial Rx parameter.

Figure 3:
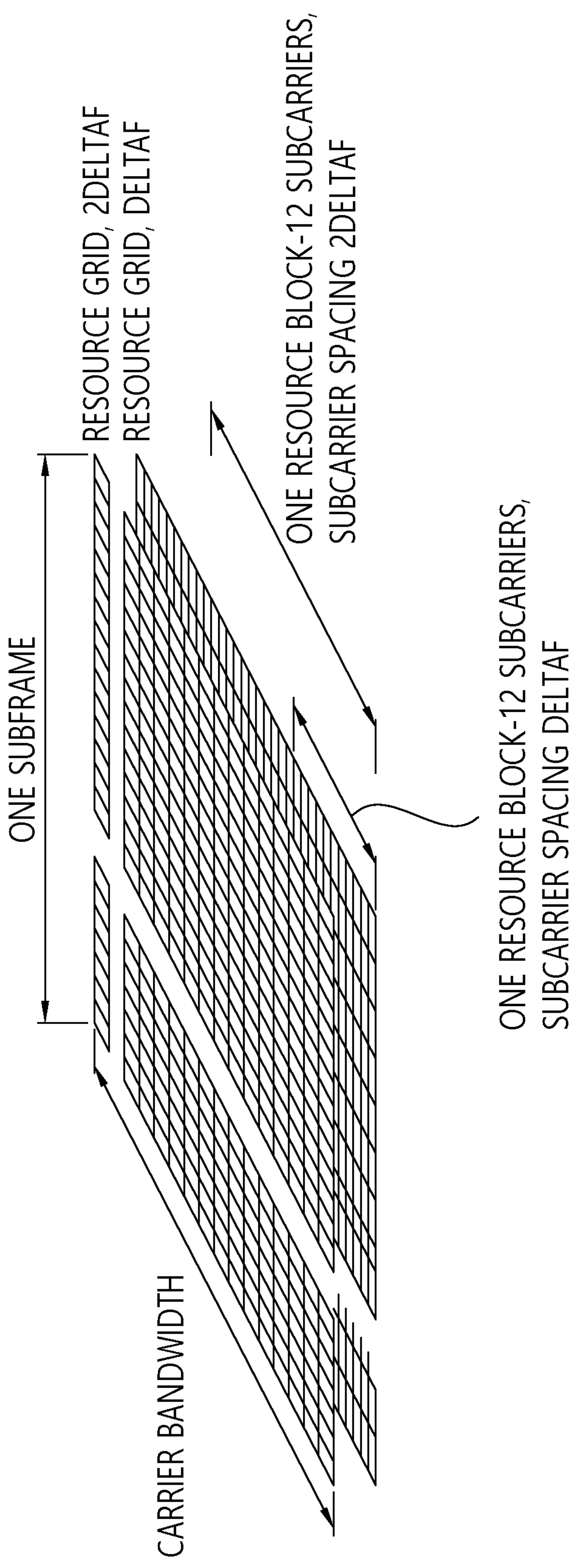
FIG. 3 is a diagram illustrating a resource grid supported by wireless access technology to which the present embodiment is applicable.

FIG. 3 is a diagram illustrating a resource grid supported by wireless access technology to which the present embodiment is applicable.

Referring to FIG. 3, since NR supports multiple numerology on the same carrier, a resource grid may be present for each numerology. Additionally, a resource grid may be present depending on an antenna port, a subcarrier spacing, and a transmission direction.

A resource block consists of 12 subcarriers and is defined only in the frequency domain. Additionally, a resource element consists of one OFDM symbol and one subcarrier. Therefore, as shown in FIG. 3, the size of one resource block may vary depending on the subcarrier spacing. Additionally, in NR, "Point A", which serves as a common reference point for a resource block grid, a common resource block, a physical resource block, and the like are defined.

Figure 4:
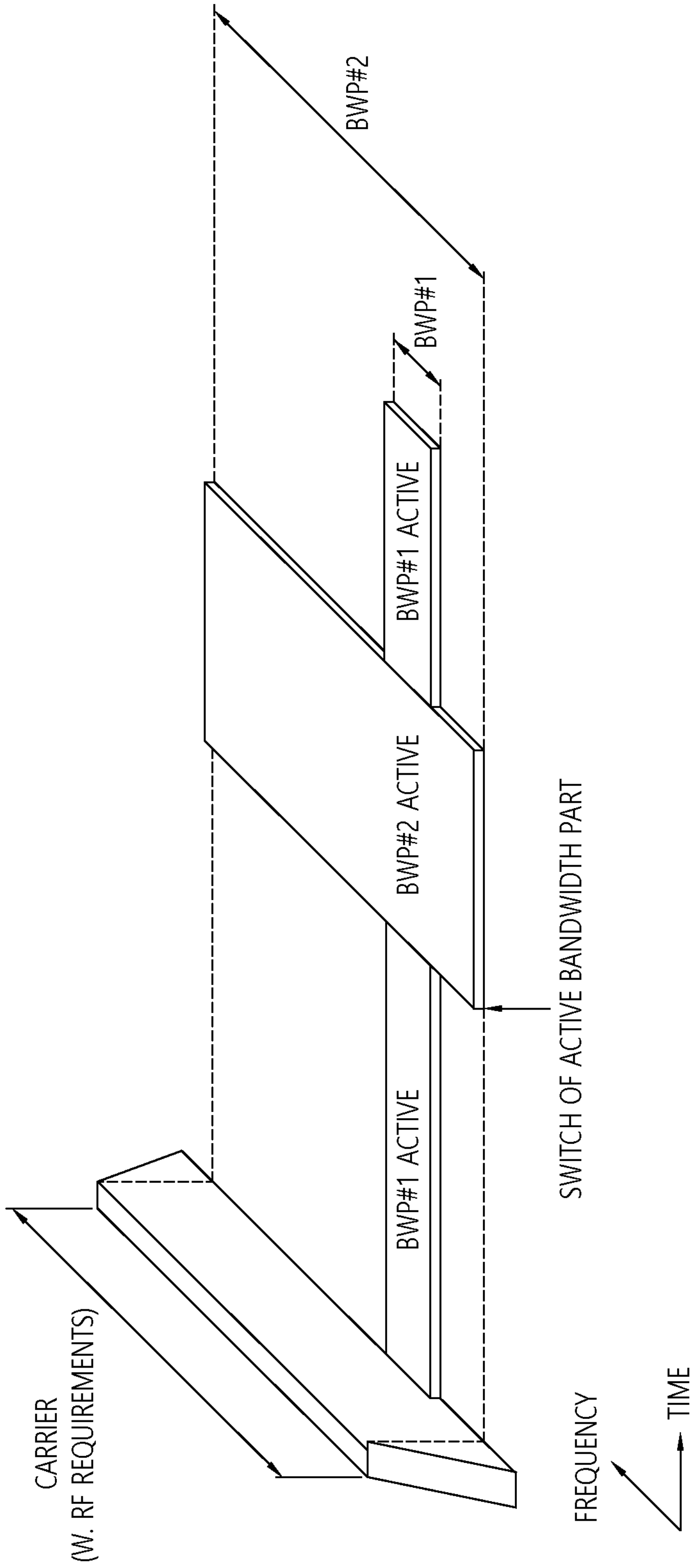
FIG. 4 is a diagram illustrating bandwidth parts (BWPs) supported by the wireless access technology to which the present embodiment is applicable.

FIG. 4 is a diagram illustrating bandwidth parts supported by the wireless access technology to which the present embodiment is applicable.

In NR, unlike LTE in which a carrier bandwidth is fixed to 20 MHz, the maximum carrier bandwidth is set in a range of 50 MHz to 400 MHz for each subcarrier spacing. Therefore, it is not assumed that all UEs use all of these carrier bandwidths. Accordingly, in NR, a UE can designate and use a bandwidth part (BWP) within the carrier bandwidth as shown in FIG. 4. Additionally, the bandwidth part is linked to one numerology, includes a subset of consecutive common resource blocks, and can be activated dynamically over time. Up to four bandwidth parts are configured for each UE on each of uplink and downlink, and data is transmitted and received using a bandwidth part activated at a given time.

In the case of a paired spectrum, uplink and downlink bandwidth parts are set independently, and in the case of an unpaired spectrum, downlink and uplink bandwidth parts are set in pairs such that they can share a center frequency in order to prevent unnecessary frequency re-tuning between downlink and uplink operations.

<NR Initial Access>

In NR, a UE performs cell search and random access procedures to connect to a base station and perform communication.

Cell search is a procedure in which a UE synchronizes to the cell of the corresponding base station using a synchronization signal block (SSB) transmitted by the base station, obtains a physical layer cell ID, and obtains system information.

Figure 5:
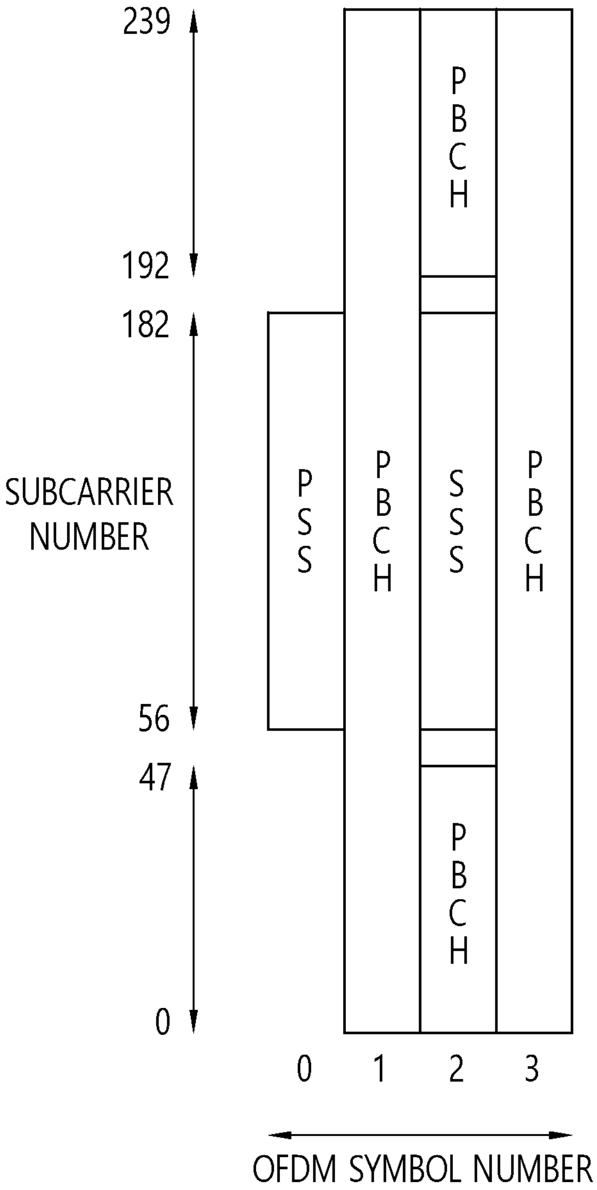
FIG. 5 is a diagram showing a synchronization signal block in the wireless access technology to which the present embodiment is applicable.

FIG. 5 is a diagram illustrating a synchronization signal block in the wireless access technology to which the present embodiment is applicable.

Referring to FIG. 5, the SSB includes a primary synchronization signal (PSS) and a secondary synchronization signal (SSS) each occupying 1 symbol and 127 subcarriers, and a PBCH spanning 3 OFDM symbols and 240 subcarriers.

A UE monitors the SSB in the time and frequency domains and receives the SSB.

The SSB can be transmitted up to 64 times in 5 ms. Multiple SSBs are transmitted through different transmission beams within 5 ms, and the UE performs detection on the assumption that SSBs are transmitted every 20 ms interval based on one specific beam used for transmission. The number of beams that can be used for SSB transmission within 5 ms can increase as the frequency band becomes higher. For example, up to 4 SSB beams can be transmitted at 3 GHz or lower, up to 8 SSB beams can be transmitted in frequency bands from 3 to 6 GHz, and up to 64 different beams can be used to SSB transmission in frequency bands above 6 GHz.

Two SSBs are included in one slot, and the start symbol and number of repetitions within the slot are determined depending on the subcarrier spacing.

Meanwhile, unlike SS in conventional LTE, SSB is not transmitted at the center frequency of the carrier bandwidth. That is, SSBs can also be transmitted in parts other than the center of the system band, and when broadband operation is supported, multiple SSBs can be transmitted in the frequency domain. Accordingly, a UE monitors the SSBs using a synchronization raster, which is a candidate frequency position for monitoring SSBs. A carrier raster, which is center frequency position information of a channel for initial access, and the synchronization raster have been newly defined in NR, and the synchronization raster has a wider frequency interval than the carrier raster and thus can support rapid SSB search of a UE.

A UE can obtain an MIB through the PBCH of the SSB. The master information block (MIB) includes information for the UE to receive the remaining minimum system information (RMSI) broadcast by a network. In addition, the PBCH may include information on the position of the first DM-RS symbol in the time domain, information for the UE to monitor SIB1 (e.g., SIB1 numerology information, information regarding SIB1 CORESET, search space information, PDCCH related parameter information, and the like), offset information between a common resource block and the SSB (the position of the absolute SSB within the carrier is transmitted through SIB1), and the like. Here, the SIB1 numerology information is equally applied to some messages used in the random access procedure for accessing the base station after the UE completes the cell search procedure. For example, the SIB1 numerology information can be applied to at least one of messages 1 to 4 for the random access procedure.

The above-described RMSI may mean system information block 1 (SIB1), and SIB1 is broadcast periodically (e.g., 160 ms) in the cell. SIB1 includes information necessary for a UE to perform the initial random access procedure and is transmitted periodically through a PDSCH. In order for the UE to receive SIB1, the UE needs to receive numerology information used for SIB1 transmission and control resource set (CORESET) information used for SIB1 scheduling through a PBCH. The UE checks scheduling information for SIB1 using SI-RNTI in the CORESET and acquires SIB1 on the PDSCH according to the scheduling information. Except for SIB1, the remaining SIBs may be transmitted periodically or transmitted according to a request of the UE.

<6G System>

A next-generation communication system after 5G or 5G-Advanced will be described. Hereinafter, for convenience, the next-generation communication system will be referred to as a 6G system.

The 6G (wireless communications) system is for the purpose of (i) a very high data rate per device, (ii) a very large number of connected devices, (iii) global connectivity, (iv) very low latency, (v) reduction of energy consumption of battery-free IoT devices, (vi) ultra-reliable connectivity, (vii) connected intelligence with machine learning capabilities, and the like. The vision of the 6G system may have four aspects such as intelligent connectivity, deep connectivity, holographic connectivity, and ubiquitous connectivity. Although the requirements or key performance indicators (KPIs) for the 6G system have not yet been determined, it is expected that the 6G system will have the requirements as shown in Table 2. That is, Table 2 shows an example of the requirements of the 6G system.

TABLE 2

| | |
|---|---|
| Peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine-type communication (mMTC), AI integrated communication, tactile Internet, high throughput, high network capacity, high energy efficiency, low backhaul and access network congestion, and enhanced data security.

Hereinafter, artificial intelligence (AI) will be described.

The most important and newly introduced technology in the 6G system is AI. AI was not involved in the 4G system. The 5G system will support partial or very limited AI. However, the 6G system will support AI for full automation. Advances in machine learning will create more intelligent networks for real-time communication in 6G. Introducing AI in communication can simplify and improve real-time data transmission. AI can use numerous analytics to determine a method of performing complex target operations. That is, AI can increase efficiency and reduce processing delays.

Time-consuming operations such as handover, network selection, and resource scheduling can be performed instantly by using AI. AI can also play an important role in M2M, machine-to-human and human-to-machine communications. Additionally, AI can enable rapid communication in a brain computer interface (BCI). AI-based communication systems can be supported by metamaterials, intelligent structures, intelligent networks, intelligent devices, intelligent cognitive radio, self-sustaining wireless networks, and machine learning.

Recently, attempts have been made to integrate AI with wireless communication systems and have been focused on an application layer and a network layer, and particularly, deep learning has been focused on the field of wireless resource management and allocation. However, such research is gradually advancing to the MAC layer and physical layer, and attempts are being made to combine deep learning with wireless transmission, especially in the physical layer. AI-based physical layer transmission means applying signal processing and communication mechanisms based on AI drivers, rather than traditional communication frameworks, in fundamental signal processing and communication mechanisms. For example, this may include deep learning-based channel coding and decoding, deep learning-based signal estimation and detection, deep learning-based MIMO mechanism, AI-based resource scheduling and allocation, etc.

Machine learning can be used for channel estimation and channel tracking, and can be used for power allocation, interference cancellation, and the like in the physical layer of downlink (DL). Machine learning can also be used for antenna selection, power control, and symbol detection in MIMO systems.

However, application of a DNN for transmission in the physical layer may have the following problems.

Deep learning-based AI algorithms require a large amount of training data in order to optimize training parameters. However, due to limitations in acquiring data in a specific channel environment as training data, a lot of training data is used offline. This means that static training on training data in a specific channel environment may result in a contradiction between dynamic characteristics and diversity of a radio channel.

Additionally, current deep learning mainly targets real signals. However, signals of the physical layer of wireless communication are complex signals. More research on neural networks that detect complex domain signals to match characteristics of radio communication signals is required.

Hereinafter, machine learning will be described in more detail.

Machine learning refers to a series of operations for training machines to create machines that can perform tasks that are difficult or difficult for humans to perform. Machine learning requires data and a learning model. In machine learning, data learning methods can be broadly divided into three types: supervised learning, unsupervised learning, and reinforcement learning.

Neural network learning is intended to minimize errors in output. Neural network learning is a process of repeatedly inputting training data into a neural network, calculating the output of the neural network and errors in a target with respect to the training data, and backpropagating errors of the neural network in a direction from the output layer of the neural network to the input layer to reduce the errors, thereby updating the weight of each node in the neural network.

Supervised learning uses training data in which correct answers are labeled, whereas unsupervised learning may use training data in which correct answers are not labeled. That is, in the case of supervised learning with respect to data classification, for example, training data may be data in which each piece of training data is labeled with a category. Labeled training data is input to a neural network, and error can be calculated by comparing the output (category) of the neural network with the label of the training data. The calculated error is backpropagated in the reverse direction (i.e., a direction from the output layer to the input layer) in the neural network, and a connection weight of each node in each layer of the neural network can be updated according to backpropagation. The amount of change in the updated connection weight of each node may be determined according to a learning rate. Calculation of the neural network on input data and backpropagation of error can constitute a learning cycle (epoch). The learning rate may be applied differently depending on the number of repetitions of the learning cycle of the neural network. For example, in the early stages of neural network training, a high learning rate can be used to ensure that the neural network rapidly achieves a certain level of performance to increase efficiency, and in the later stages of training, a low learning rate can be used to increase accuracy.

Training methods may vary depending on characteristics of data. For example, when the goal is to accurately predict data transmitted from a transmitter at a receiver in a communication system, it is preferable to perform training using supervised learning rather than unsupervised learning or reinforcement learning.

A learning model corresponds to the human brain, and the most basic linear model can be considered. However, deep learning is a machine learning paradigm that uses a highly complex neural network structure such as artificial neural networks as a learning model.

Neural network cores used as learning methods are broadly divided into a deep neural network (DNN), a convolutional deep neural network (CNN), and a recurrent neural network (RNN).

An artificial neural network is an example of connecting multiple perceptrons.

Hereinafter, Tera-Hertz (THz) communication will be described.

A data transmission rate can be increased by increasing a channel bandwidth. In order to easily secure a wide channel bandwidth, a high frequency band needs to be used, and thus a communication method using a sub-THz band, which is a frequency band higher than 100 GHz, and a THz band higher than the sub-THz band is considered. Since an antenna size and an antenna spacing are small in communication methods using high frequency bands, advanced large-scale MIMO can be applied thereto. THz waves also known as submillimeter radiation typically represent a frequency band between 0.1 THz and 10 THz with a wavelength in the range 0.03 mm to 3 mm. The range of 100 GHz to 300 GHz (sub-THz band) is regarded as a main part of a THz band for cellular communication. Frequency bands up to 100 GHz were considered in 5G mobile communication, and the sub-THz band and THz band are expected to be used in 6G mobile communication.

6G mobile communication uses sub-THz and THz bands in addition to the existing mmWave band. If the Sub-THz band is added to the mmWave band, much more frequency resources are used, making it easier to increase a channel bandwidth, resulting in an increased data transmission rate and cell throughput. Among defined THz bands, 300 GHz to 3 THz belong to the far infrared (IR) frequency band. The band of 300 GHz to 3 THz is a part of an optic band, but is at the border of the optic band and immediately behind the RF band. Therefore, the band of 300 GHz to 3 THz shows similarity to RF.

Key characteristics of THz communication include (i) a considerably wide channel bandwidth that can be widely used to support very high data rates, and (ii) high path loss occurring at a high frequency (highly directional antennas are indispensable). The antenna size and antenna spacing are small due to a short wavelength, and thus a significant number of antennas can be disposed in a small area. A narrow beam generated by applying beamforming to such many antennas can reduce interference. That is, the short wavelength of THz signals allows a much larger number of antenna elements to be integrated into a device and a BS operating in this band. This enables the use of advanced adaptive array techniques that can overcome range limitations.

THz wireless communication uses wireless communication using THz waves with a frequency of approximately 0.1 to 10 THz (1 THz=1000 GHz) and refers to terahertz (THz) band wireless communication using a very high carrier frequency of 100 GHz or more. THz waves are located between radio frequency (RF)/millimeter (mm) and infrared bands, (i) penetrate non-metal/non-polarized materials well as compared to visible light/infrared ray, have a shorter wavelength than RF/millimeter waves and thus have high straightness, and can focus a beam. In addition, the photon energy of THz waves is merely a few meV and thus the THz waves are harmless to the human body. The frequency band expected to be used for THz wireless communication may be D-band (110 GHz to 170 GHz) or H-band (220 GHz to 325 GHz) bands which have small propagation loss due to absorption of molecules in the air. In addition to 3GPP, standardization for THz wireless communication is under discussion with the IEEE 802.15 THz working group as a center, and standard documents issued by the IEEE 802.15 Task Group (TG3d, TG3e) can specify or supplement the content described in this specification. THz wireless communication can be applied to wireless cognition, sensing, imaging, wireless communication, THz navigation, etc.

THz wireless communication scenarios can be classified into a macro network, a micro network, and a nanoscale network. In the macro network, THz wireless communication can be applied to vehicle-to-vehicle (V2V) communication and backhaul/fronthaul connection. In the micro network, THz wireless communication can be applied to indoor small cells, fixed point-to-point or multi-point connection such as wireless connections in data centers, and near-field communication such as kiosk downloading.

<Line-of-Sight (LoS) MIMO System>

The MIMO system uses multiple transmit antennas and multiple receive antennas to support spatial multiplexing (SM). When a channel matrix between a transmitter and a receiver is H, the elements of H are composed of channel gain values between the transmitter and the receiver. The number of spatially separable layers between the transmitter and receiver is equal to the rank of the channel matrix H, and a transmitter supporting SM can transmit different data to a receiver through multiple layers. In theory, the maximum data rate or throughput of the MIMO system can increase in proportional to the number of ranks. When the number of ranks provided by H is rank(H), the maximum value of rank(H) is $\min(N_T, N_R)$. Here, $N_T$ is the number of transmit antennas, $N_R$ is the number of receive antennas, and min(A, B) means the minimum value between A and B.

A state in which a signal transmitted from a transmit antenna can be delivered to a receive antenna in a straight line without any obstacle is called a LoS (Line of Sight) environment. In general, since signals transmitted from multiple transmit antennas reach a receive antenna through various paths reflected by obstacles, the rank of the channel matrix H may be greater than 1 and there may be multiple spatially separable layers. However, in the LoS environment (particularly in a case where a transmit antenna and a receive antenna are relatively close), SM cannot be applied because the rank of the channel matrix is almost 1 even if there are multiple transmit and receive antennas. This is because the correlation between channel gain values, which are elements of the channel matrix H, increases.

To apply SM in this LoS environment, the physical structure of the antenna needs to be improved or multiple layers transmitted from a transmitter to a receiver need to be created using various characteristics such as signal polarization. As an example, a method of using a vertical-horizontal (V-H) polarization or X-polarization (or cross polarization) antenna can double the transmission rate as in SM even in the LoS environment by configuring two physically separable layers. In addition, two or more layers can be created in the LoS environment by applying two or more different types of LoS MIMO at the same time.

Figure 6:
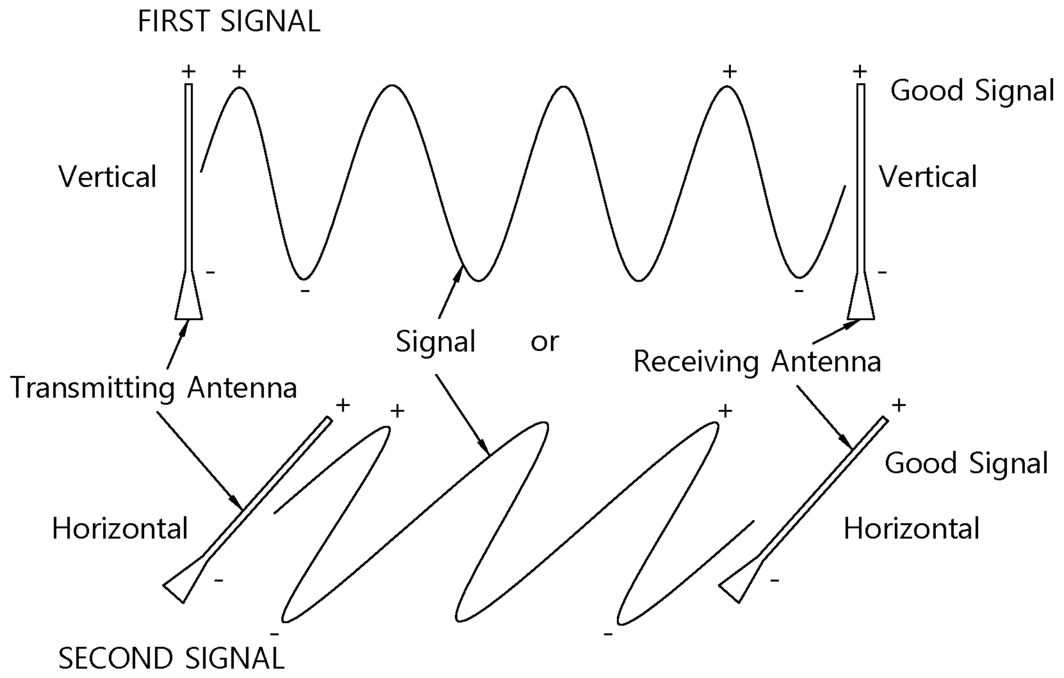
FIG. 6 is a diagram illustrating the principle of a vertical-horizontal (V-H) polarization antenna.
Figure 6:
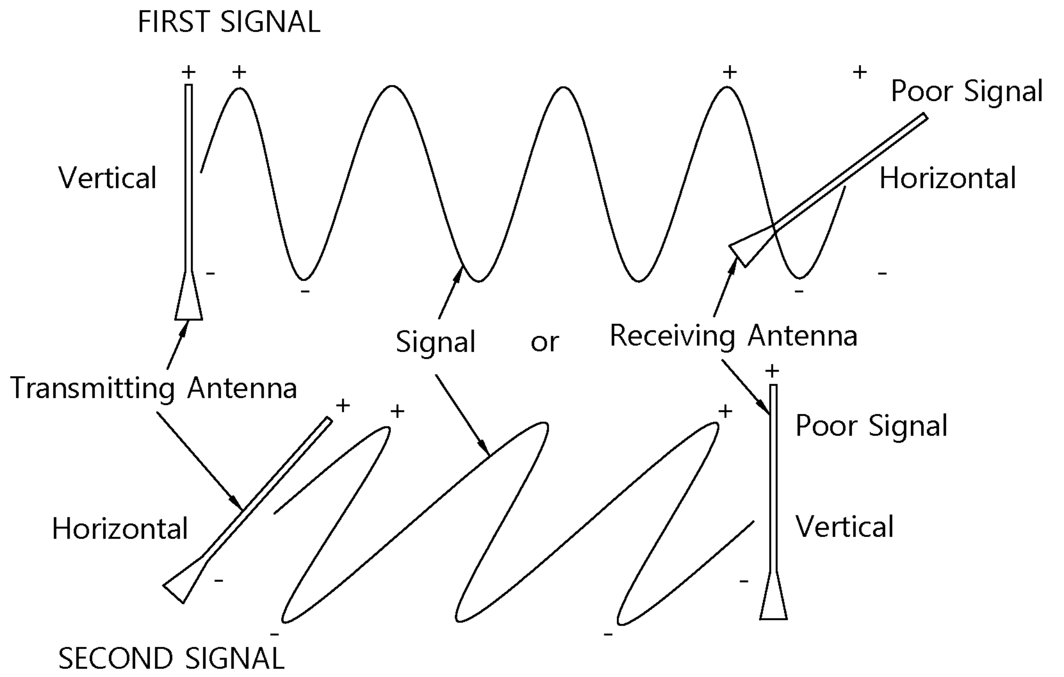

FIG. 6 is a diagram illustrating the principle of a V-H polarization antenna.

Referring to FIG. 6, the V-H polarization antenna has a vertical antenna and a horizontal antenna having an angle of 90 degrees therebetween such that signals of the antennas can be physically distinguished. Alternatively, a cross polarization (or X-polarization) antenna may use two cross antennas forming +45 degrees and −45 degrees. The first signal transmitted from the vertical antenna of the transmitter can be received by the vertical antenna of the receiver, as shown in (a) but is not well received by the horizontal antenna of the receiver, as shown in (b). On the other hand, the second signal transmitted from the horizontal antenna of the transmitter can be well received by the horizontal antenna of the receiver, as shown in (a), but is not well received by the vertical antenna of the receiver, as shown in (b).

This is because the channel can be divided into two (i.e., two layers are formed) between the transmit antenna and the receive antenna on the basis of the V-H polarization antenna. In this case, different signals (or data) can be transmitted through the respective channels, and thus the effect of forming two layers from two ranks is obtained. Hereinafter, in this specification, a MIMO system that can support two or more ranks in the LoS environment or during LoS communication is simply referred to as an LoS MIMO system. The LoS environment can be used interchangeably with various terms such as LoS conditions, LoS communication environment, and LoS state.

In this specification, the LoS MIMO system may include a V-H polarization or X polarization (cross-pol.) antenna to support multiple ranks even in the LoS environment. However, the LoS MIMO system may include any physical antenna structure capable of providing multiple ranks in the LoS environment, and is not necessarily limited to having a V-H polarization or X polarization antenna. For example, the LoS MIMO system may use any one of a linear polarization antenna (vertical-horizontal, cross polarization (X-pole, ±45 degrees)), a circular polarization antenna (left-circular, right-circular), and an elliptical polarization antenna or a combination of at least one thereof.

When using the existing MIMO and SM in a LoS environment, the rank becomes 1 and SM cannot be applied, but when using the LoS MIMO system, the rank becomes 2 or more, which can increase data transmission rate.

Additionally, if the number of antennas is large, a combination of LoS MIMO and beamforming may be possible. For example, if V-H polarization LoS MIMO and beamforming are combined, a beam can be formed with multiple antennas in the vertical direction and a beam can be formed with multiple antennas in the horizontal direction to create two layers with the two beams.

Figure 7:
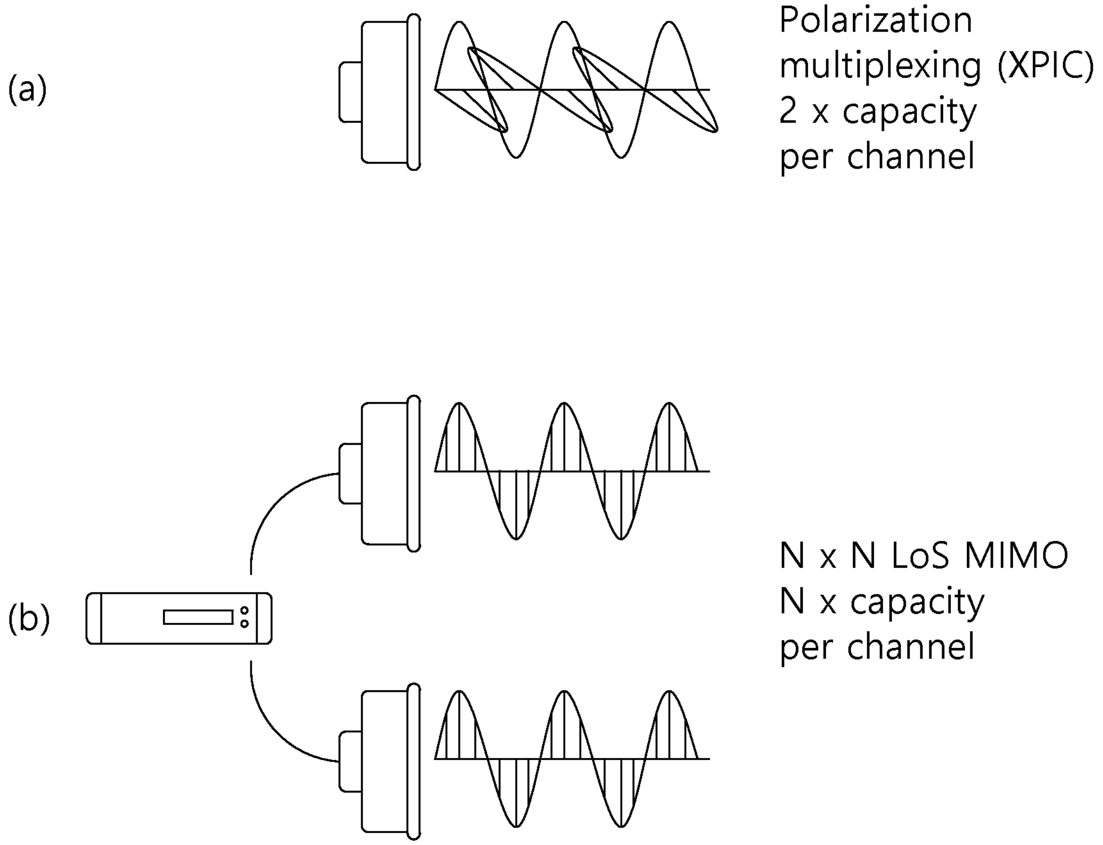
FIG. 7 shows a LoS MIMO system used for microwave transmission according to an example.

FIG. 7 shows a LoS MIMO system used for microwave transmission according to an example.

Referring to FIG. 7, (a) shows polarization multiplexing supporting twice the capacity (2×), and (b) shows an N×N LoS MIMO system supporting N times the capacity (N×). Unlike microwave transmission systems, mobile communication systems have wide antenna beams. Therefore, in mobile communication systems, N×N LoS MIMO in (b) can be considered in special cases. On the other hand, polarization multiplexing in (a) can be used in a high-frequency LoS environment and thus can also be considered in mobile communication systems.

The LoS MIMO system can be applied to all frequency bands used in general mobile communications. In particular, the LoS MIMO system is very important in high frequency bands (e.g., 10 GHz to 100 GHz, or hundreds of GHz or Tera-Hz (THz)). This is because the coverage is small in such high frequency bands and thus there is a high possibility of an LoS environment being formed between a transmit antenna and a receive antenna. That is, in high-frequency bands, the transmission distance is relatively close, and there is a high possibility that more communication will occur in the LoS environment where waves are directly visible rather than reflected waves.

Additionally, in a case where signals are transmitted and received in the air, such as in a non-terrestrial network (NTN) environment using unmanned (or uncrewed) aerial vehicles or satellites, the LoS environment may occur frequently.

Scenarios in which the LoS MIMO system is applied to high-frequency band mobile communication systems are as follows.

i) LoS environment where a base station and a UE are relatively close: In this case, LoS MIMO performance may vary depending on the frequency and channel environment.

ii) LoS environment during D2D or V2V communication: Direct communication between servers in a data center, direct communication between vehicles, V2V in a platooning situation of vehicles, communication between drones in the air, communication between personal aerial vehicles (PAVs) or uncrewed aerial vehicles (UAVs), etc.

iii) LoS environment between a public base station and a UE

A maximum of 100 GHz is considered in the 5G mobile communication system, and a band of 100 to 300 GHz is expected to be added basically and the THz band is also be considered in the 6G mobile communication system. In the 100-300 GHz band or higher frequencies considered in the 6G mobile communication system, a very short distance between a transmitter and a receiver and a transmission rate of tens to hundreds of Gbps are required. To support this transmission rate, next-generation mobile communication systems basically use multiple antennas not only for the transmitter but also for the receiver. As next-generation mobile communication systems use higher frequency bands, the frequency of communication in the LoS environment may increase. In this case, there is a high possibility that the rank will converge to 1 and existing (or legacy) spatial multiplexing (SM) will not be supported.

Therefore, next-generation mobile communication systems are likely to adopt the LoS MIMO system and use a method different from protocols supporting the existing SM. Therefore, a new reference signal is required for introducing the LoS MIMO system into 5G of 3GPP, 6G, and standard technology of subsequent generations.

1. Design of Method for Ascertaining New CSI-RS or Channel State Information (CSI) for LoS MIMO A channel state information reference signal (CSI-RS) for LoS MIMO is designed in a different way from the CSI-RS (hereinafter referred to as a legacy CSI-RS) designed for existing (or legacy) beamforming or spatial multiplexing. That is, the CSI-RS for LoS MIMO can be defined or designed differently from the legacy CSI-RS in terms of CSI-RS configuration, pattern, resource mapping method, and antenna port settings. This means that the legacy CSI-RS and the CSI-RS for LoS MIMO coexist on a resource grid. The CSI-RS for LoS MIMO is defined separately from the legacy CSI-RS. Alternatively, a new method different from the methods used in existing 5G may be considered in order to ascertain CSI for LoS MIMO.

Figure 8:
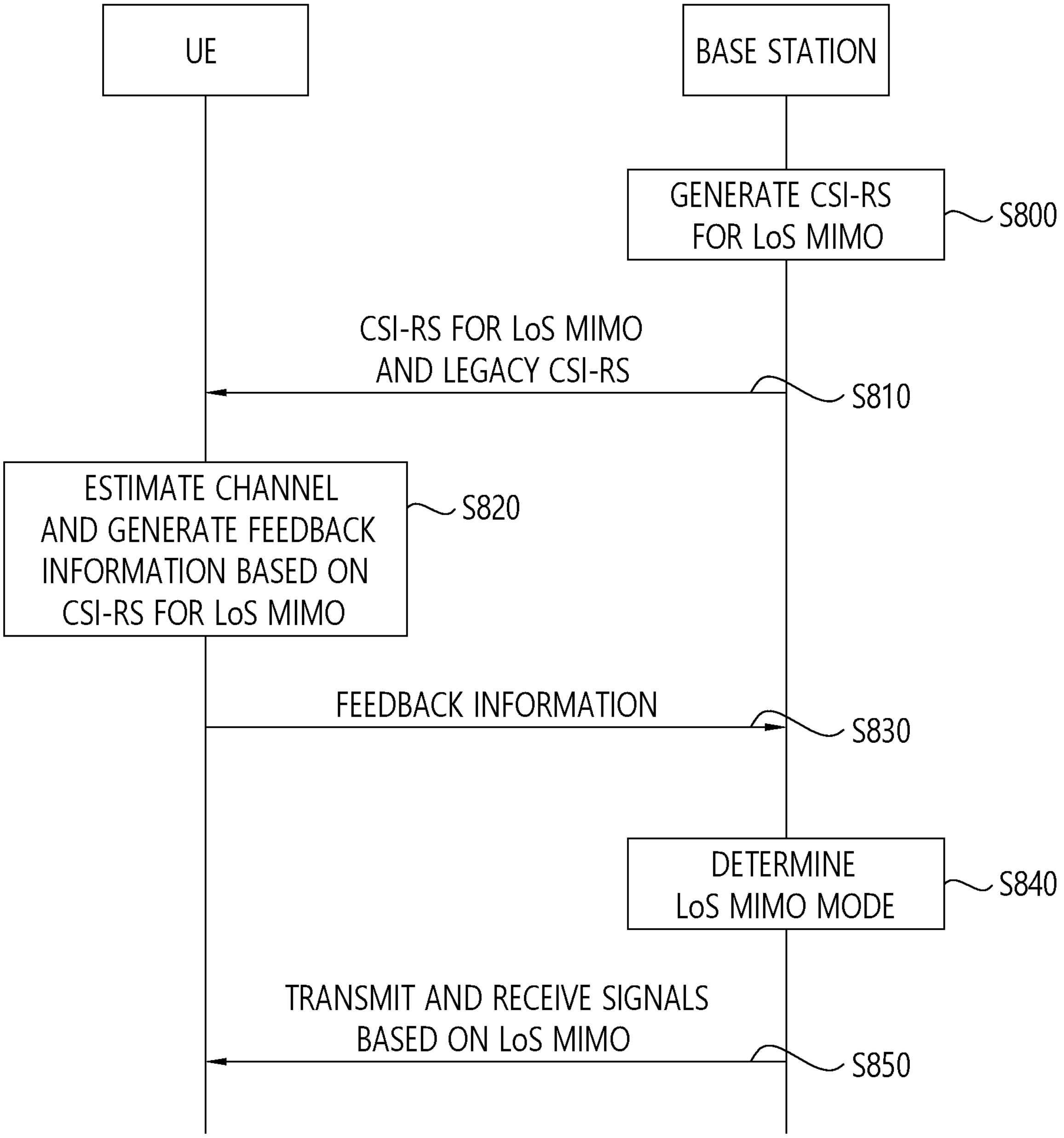
FIG. 8 is a flowchart showing a method of transmitting a CSI-RS according to an example.

FIG. 8 is a flowchart showing a method of transmitting a CSI-RS according to an example.

Referring to FIG. 8, a base station generates the CSI-RS for LoS MIMO (S800). Step S800 includes a step in which the base station generates a sequence for the CSI-RS.

As an example, the CSI-RS for LoS MIMO may have a specific antenna port number. Among all CSI-RS antenna port numbers, some may be assigned to the legacy CSI-RS antenna ports, and others may be assigned to the CSI-RS antenna ports for LoS MIMO. For example, if there are a total of 64 CSI-RS antenna ports, 0 to 31 may be assigned to the legacy CSI-RS antenna ports, and 32 to 63 may be assigned to the CSI-RS antenna ports for LoS MIMO.

In the LoS MIMO system based on a vertical-horizontal (V-H) polarized antenna, a CSI-RS antenna port for the vertical antenna and a CSI-RS antenna port for the horizontal antenna may be different. If a vertical-horizontal polarization antenna and an X-polarization antenna are combined, or the number of LoS MIMO layers increases, more CSI-RSs can be added accordingly.

When LoS MIMO and beamforming are combined, a CSI-RS may be used separately.

The base station transmits the CSI-RS for LoS MIMO and the legacy CSI-RS to a UE (S810). Step S810 includes a step in which the base station maps the sequence for the CSI-RS generated in step S800 to a specific time/frequency resource and transmits the same.

As an example, the position of the time/frequency resource to which the CSI-RS is mapped may be determined based on a mathematical formula using at least one parameter related to LoS MIMO as a variable. For example, when a polarization value is p, p=0 represents vertical polarization, p=1 represents horizontal polarization, and the time/frequency resource to which the CSI-RS is mapped can be determined on the basis of a mathematical formula using this value p as a variable.

As another example, in the LoS MIMO system based on a vertical-horizontal (V-H) polarized antenna, a CSI-RS pattern for the vertical antenna and a CSI-RS pattern for the horizontal antenna may be different. A CSI-RS pattern for LoS MIMO can be set in a different way (CSI-RS transmission period, number of times, etc.) from the legacy CSI-RS pattern. This configuration can be performed by separate RRC signaling.

The UE performs channel estimation based on the CSI-RS for LoS MIMO and generates feedback information (S820). Here, the feedback information may include at least some of an indicator indicating whether LoS MIMO is possible, and a precoding matrix indicator (PMI), a rank indicator (RI), and a channel quality indicator (CQI) as a channel station information report. The UE transmits the number of available layers, channel status measurement values (CQI, etc.) for each layer, candidate PMI values, and the like to the base station using the CSI-RS for LoS MIMO. Here, the existing (or legacy) PMI may not be used in the LoS MIMO system. In this case, the PMI values may mean information related to precoding applied in the LoS MIMO system.

A method of performing channel estimation based on the CSI-RS for LoS MIMO may be different from the channel estimation method based on the legacy CSI-RS.

In the case of channel estimation based on the legacy CSI-RS, the UE calculates the rank on the basis of the existing MIMO antenna structure and the legacy CSI-RS. In the LoS situation, the rank is 1, and thus the UE generates feedback information indicating rank indicator=1 and reports the same to the base station, and the base station cannot perform SM.

On the other hand, in the case of channel estimation based on the CSI-RS for LoS MIMO, the UE calculates the first rank on the basis of the legacy CSI-RS and the second rank on the basis of the CSI-RS for LoS MIMO. In the LoS situation, the first rank is 1, but the second rank may be greater than 1. The UE generates feedback information with the first rank indicator=1 and the second rank indicator>1 and reports the same to the base station. That is, the UE measures how many layers can be distinguished for LoS MIMO, calculates a channel status value (e.g. CQI value) of each layer, and reports the same. The base station can determine whether LoS MIMO can be performed, the number of layers at the time of performing LoS MIMO, an MCS level for each layer, and the like on the basis of the second rank indicator, and perform SM based on LoS MIMO.

Meanwhile, in a case where LoS MIMO is used, beamforming may be applied to each layer (or each polarization), and thus a codebook and precoding for the case of applying LoS MIMO can be used. In this case, the codebook and precoding for LoS MIMO are designed differently from legacy beamforming or SM, and an RF chain or a connection path of a transceiver-RF-antenna for actual implementation may be different.

For example, in the case of LoS MIMO based on a vertical-horizontal polarization antenna, a transmitter may perform first beamforming using multiple vertical antennas and perform second beamforming different from the first beamforming using multiple horizontal antennas. In this case, codebooks and/or precoding matrices for vertical polarization and horizontal polarization may be applied separately.

Here, a separate DM-RS for LoS MIMO is required to coherently demodulate signals transmitted to each layer. This will be described in detail in FIG. 9.

The UE transmits the feedback information to the base station (S830).

The base station determines whether to apply LoS MIMO (or whether to switch to a LoS MIMO mode) on the basis of the feedback information (S840).

Upon determining that LoS MIMO will be applied, the base station transmits/receives signals to/from the UE based on LoS MIMO (S850). In the case of downlink transmission, step S850 includes a step in which the base station generates a downlink signal for each layer defined by LoS MIMO and a step in which the base station transmits each downlink signal to the UE through the corresponding layer. The UE sets a receive antenna thereof to the LoS MIMO mode and receives and decodes the downlink signal for each layer. In the case of uplink transmission, step S850 includes a step in which the UE generates an uplink signal for each layer defined by LoS MIMO and a step in which the UE transmits each uplink signal to the base station through the corresponding layer. The base station sets a receive antenna thereof to the LoS MIMO mode and receives and decodes the uplink signal for each layer.

2. Design of New DM-RS for LoS MIMO

A demodulation reference signal (DM-RS) for LoS MIMO is designed in a different way from the existing DM-RS (hereinafter referred to as a legacy DM-RS) designed for existing beamforming or spatial multiplexing. That is, the DM-RS for LoS MIMO may be defined or designed differently from the legacy DM-RS in terms of the DM-RS configuration or pattern, resource mapping method, antenna port settings, and density. This means that the legacy DM-RS and the DM-RS for LoS MIMO coexist on a resource grid. The DM-RS for LoS MIMO is defined separately from the legacy DM-RS.

Figure 9:
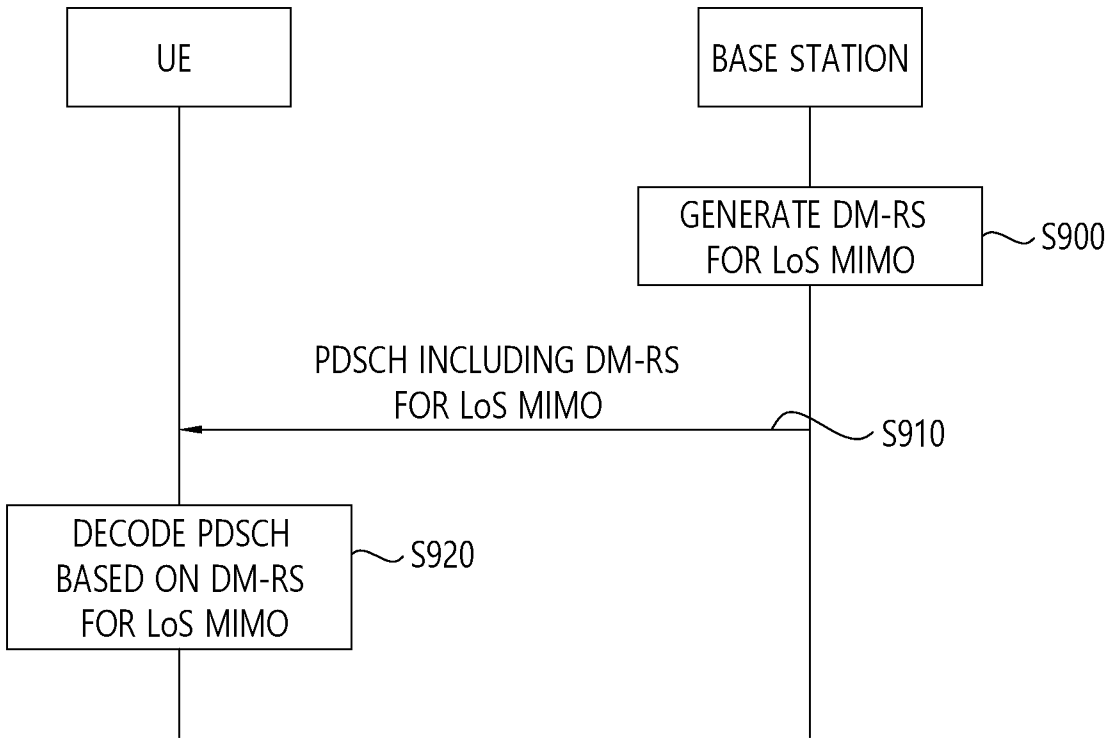
FIG. 9 is a flowchart showing a method of transmitting a DM-RS according to an example.

FIG. 9 is a flowchart showing a method of transmitting a DM-RS according to an example.

Referring to FIG. 9, a base station generates the DM-RS for LoS MIMO (S900). Step S900 includes a step in which the base station generates a sequence for the DM-RS.

As an example, the DM-RS for LoS MIMO may have a specific antenna port number. Among all DM-RS antenna port numbers, some may be assigned to legacy DM-RS antenna ports, and others may be assigned to DM-RS antenna ports for LoS MIMO. For example, if there are a total of 64 DM-RS antenna ports, 0 to 31 may be assigned to legacy DM-RS antenna ports, and 32 to 63 may be assigned to DM-RS antenna ports for LoS MIMO.

In the LoS MIMO system based on a vertical-horizontal (V-H) polarized antenna, a DM-RS antenna port for the vertical antenna and a DM-RS antenna port for the horizontal antenna may be different. If a vertical-horizontal polarization antenna and an X-polarization antenna are combined, or the number of LoS MIMO layers increases, more DM-RSs can be added accordingly.

When LoS MIMO and beamforming are combined, a DM-RS may be added and used for each beamformed channel.

As the distance between the UE and the base station increases, layers for LoS MIMO may not be clearly distinguished. This may cause deterioration of reception performance. To compensate for this, the frequency/time resources of the DM-RS for LoS MIMO can be designed to be denser than the CSI-RS. A method of adaptively adjusting the density of the DM-RS for LoS MIMO according to a channel state or a block error rate (BER) may be used. For example, the base station can increase the density of the DM-RS for LoS MIMO when the distance between the UE and the base station exceeds a certain distance and decrease the density of the DM-RS for LoS MIMO when the distance decreases or the channel state is satisfactory and thus layers are clearly distinguished. However, as the density of the DM-RS for LoS MIMO increases, the amount of resources that can be allocated to data decreases, and thus there is a trade-off in that the transmission rate decreases. The base station transmits a PDSCH including the DM-RS for LoS MIMO to the UE (S910). Step S910 includes a step in which the base station maps the sequence for the DM-RS generated in step S900 to a specific time/frequency resource and layer, a step in which the base station generates a downlink signal for each layer defined by LoS MIMO, and a step in which the base station transmits each downlink signal to the UE through the corresponding layer. Here, the process of applying LoS MIMO to map different data to respective layers may be different from general SU-MIMO or MU-MIMO.

As an example, the position of the time/frequency resource to which the DM-RS is mapped may be determined on the basis of a mathematical formula that uses at least one parameter related to LoS MIMO as a variable. For example, when a polarization value is p, p=0 indicates vertical polarization, p=1 indicates horizontal polarization, and the time/frequency resource to which the DM-RS is mapped can be determined on the basis of a mathematical formula using this value p as a variable.

As another example, in the LoS MIMO system based on a vertical-horizontal (V-H) polarized antenna, a DM-RS pattern for the vertical antenna and a DM-RS pattern for the horizontal antenna may be different. The DM-RS pattern for LoS MIMO can be set in a different way from the legacy DM-RS pattern. This configuration can be performed by separate RRC signaling.

When LoS MIMO and beamforming are combined, the DM-RS may be added and used for each beamformed channel.

Upon receiving the PDSCH, the UE decodes the PDSCH on the basis of the DM-RS for LoS MIMO (S920). The UE sets the receive antenna thereof to the LoS MIMO mode, performs channel estimation based on the DM-RS for LoS MIMO, and then receives and decodes the downlink signal for each layer.

3. Design of New Sounding Reference Signal (SRS) for Uplink LoS MIMO

If the UE can receive LoS MIMO, LoS MIMO can also be applied to uplink transmission. To enable UL LoS MIMO, the base station needs to measure an uplink channel for LoS MIMO. Therefore, the UE transmits an SRS for LoS MIMO to the base station.

4. Design of New DM-RS for PUSCH for Uplink LoS MIMO

If the UE can receive LoS MIMO, LoS MIMO can also be applied to uplink transmission. To enable UL LoS MIMO, the UE needs to transmit an uplink DM-RS for LoS MIMO along with a PUSCH. Therefore, the UE transmits a DM-RS for LoS MIMO to the base station. When the UE performs transmission by applying LoS MIMO and beamforming together, a separate DM-RS may be included for demodulation of the beamformed signal.

Figure 10:
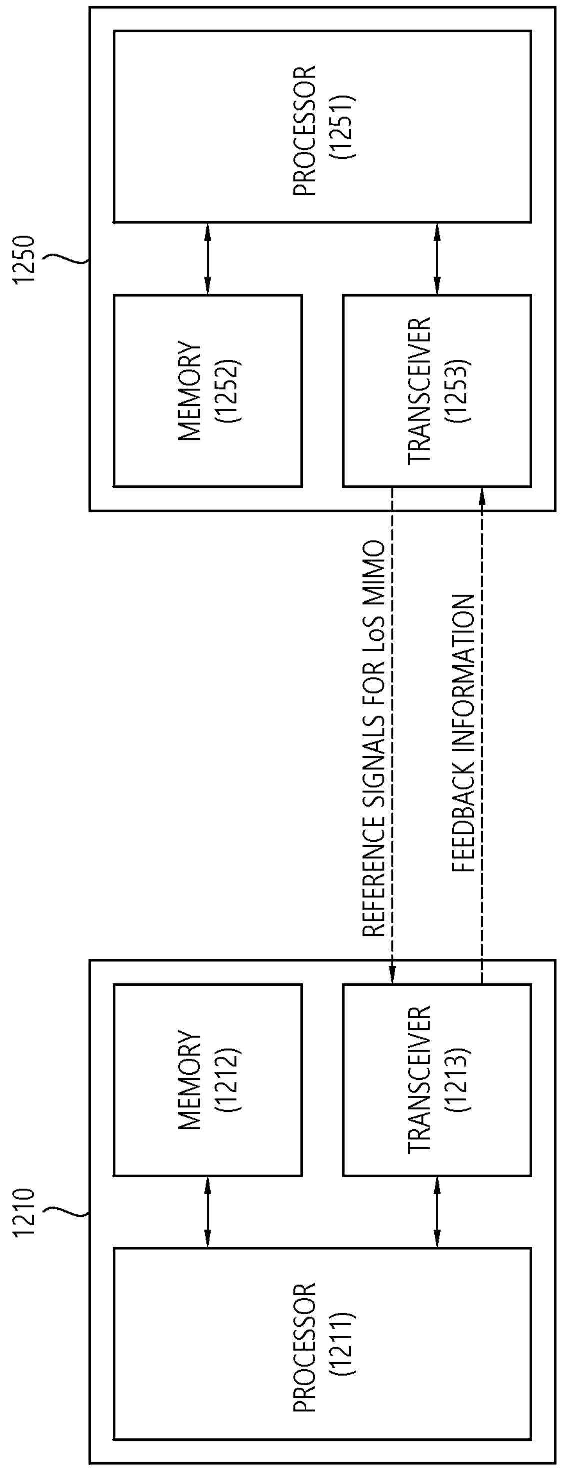
FIG. 10 shows a terminal and a base station in which an embodiment of the present disclosure is implemented.

FIG. 10 shows a UE and a base station in which an embodiment of the present disclosure is implemented.

Referring to FIG. 10, the UE 1210 includes a processor 1211, a memory 1212, and a transceiver 1213. The processor 1211 may be configured to implement functions, processes and/or methods described in this specification. Layers of a wireless interface protocol may be implemented in the processor 1211. For example, the processor 1211 may process the CSI-RS and DM-RS for LoS MIMO according to FIGS. 8 to 10, generate an SRS for LoS MIMO, and generate feedback information.

The memory 1212 is connected to the processor 1211 and stores various types of information for driving the processor 1211. The transceiver 1213 is connected to the processor 1211 and transmits a radio signal to the base station 1250 in the LoS MIMO mode or receives a radio signal from the base station 1250 in the LoS MIMO mode. The transceiver 1213 may include a linear polarization antenna (vertical-horizontal, cross polarization (X-pole,± 45 degrees)), a circular polarization antenna (left-circular, right-circular), and an elliptical polarization antenna, or one or more of more complex antenna structures to support the above-described LoS MIMO system.

The base station 1250 includes a processor 1251, a memory 1252, and a transceiver 1253. The processor 1251 may be configured to implement functions, processes and/or methods described in this specification. Layers of a wireless interface protocol may be implemented in the processor 1251. The memory 1252 is connected to the processor 1251 and stores various types of information for driving the processor 1251. The transceiver 1253 is connected to the processor 1251 and transmits a radio signal (feedback information) to the UE 1210 or receives a radio signal from the UE 1210.

The processors 1211 and 1251 may include an application-specific integrated circuit (ASIC), other chipsets, a logic circuit, and/or a data processing device. The memories 1212 and 1252 may include a read-only memory (ROM), a random access memory (RAM), a flash memory, a memory card, storage media, and/or other storage devices. The transceivers 1213 and 1253 may include a baseband circuit for processing radio frequency signals. When the embodiment is implemented in software, the above-described techniques may be implemented as modules (processes, functions, etc.) that perform the above-described functions. The modules may be stored in the memories 1212 and 1252 and executed by the processors 1211 and 1251. The memories 1212 and 1252 may be provided inside or outside the processors 1211 and 1251 and may be connected to the processors 1211 and 1251 by various well-known means.

In the above-described exemplary system, methods that can be implemented according to the above-described features of the present disclosure have been described on the basis of flow charts. For convenience, the methods have been described as a series of steps or blocks, but the claimed features of the present disclosure are not limited to the order of the steps or blocks, and some steps may occur simultaneously or in a different order than described above. Additionally, those skilled in the art will understand that the steps shown in the flowchart are not exclusive and that other steps may be included or one or more steps in a flowchart may be deleted without affecting the scope of the present disclosure.

What is claimed is:

1. A method performed by a user equipment (UE) in a wireless communication system supporting Line of Sight (LoS) Multiple Input Multiple Output (MIMO), the method comprising:

receiving a reference signal related to the LoS MIMO from a base station; and decoding the reference signal related to the LoS MIMO, wherein the LoS MIMO is MIMO supporting multiple layers-based transmission and reception based on a line of sight, wherein the reference signal related to the LoS MIMO is a channel state information reference signal (CSI-RS), wherein, based on the reference signal related to the LoS MIMO being the CSI-RS, the UE transmits feedback information to the base station, the feedback information indicating a rank indicator related to the LoS MIMO, and at least one of precoding related information related to the LoS MIMO and a channel quality indicator (CQI) related to the LoS MIMO, and wherein the rank indicator related to the LoS MIMO includes a first rank indicator based on CSI-RS for non-LoS-MIMO, the first rank indicator being 1, and a second rank indicator based on the CSI-RS for LoS MIMO, the second rank indicator being greater than 1 and being a basis for the base station to determine whether the LoS MIMO can be performed.

2. The method of claim 1, wherein the feedback information further includes an indicator indicating whether LoS MIMO-based communication for the UE is possible.

3. The method of claim 2, further comprising determining, based on the feedback information, whether to apply the LoS MIMO-based communication for the UE.

4. The method of claim 3, wherein the LoS MIMO-based communication includes LoS MIMO reception for receiving a plurality of received signals using a plurality of reception antennas of the UE.

5. The method of claim 1, wherein the LoS MIMO-specific resource is determined for the reference signal, the LoS MIMO-specific resource is determined based on a parameter related to the LoS MIMO, and the parameter includes a parameter based on a polarization structure for a part of a plurality of transmission antennas for the UE and a plurality of reception antennas.

6. The method of claim 5, wherein the polarization structure is at least one of a vertical-horizontal (V-H) polarization structure, a cross-polarization structure, a circular polarization structure, and an elliptical polarization structure.

7. A user equipment (UE) in a wireless communication system supporting Line of Sight (LoS) Multiple Input Multiple Output (MIMO), the UE comprising:

at least one memory storing instructions;

at least one transceiver; and at least one processor configured to connect the at least one memory and the at least one transceiver, wherein the at least one processor executes the instructions to:

receive a reference signal related to the LoS MIMO from a base station; and decode the reference signal related to the LoS MIMO, wherein the LoS MIMO is MIMO supporting multiple layers-based transmission and reception based on a line of sight, wherein the reference signal related to the LoS MIMO is a channel state information reference signal (CSI-RS), wherein, based on the reference signal related to the LoS MIMO being the CSI-RS, the UE transmits feedback information to the base station, the feedback information indicating a rank indicator related to the LoS MIMO, and at least one of precoding related information related to the LoS MIMO and a channel quality indicator (CQI) related to the LoS MIMO, and wherein the rank indicator related to the LoS MIMO includes a first rank indicator based on CSI-RS for non-LoS-MIMO, the first rank indicator being 1, and a second rank indicator based on the CSI-RS for LoS MIMO, the second rank indicator being greater than 1 and being a basis for the base station to determine whether the LoS MIMO can be performed.

8. The UE of claim 7, wherein the feedback information further includes an indicator indicating whether LoS MIMO-based communication for the UE is possible.

9. The UE of claim 8, wherein the at least one processor further executes the instructions to determine, based on the feedback information, whether to apply the LoS MIMO-based communication for the UE.

10. The UE of claim 9, wherein the LoS MIMO-based communication includes LoS MIMO reception for receiving a plurality of received signals using a plurality of reception antennas of the UE.

11. The UE of claim 7, wherein the LoS MIMO-specific resource is determined for the reference signal, the LoS MIMO-specific resource is determined based on a parameter related to the LoS MIMO, and the parameter includes a parameter based on a polarization structure for a part of a plurality of transmission antennas for the UE and a plurality of reception antennas.

12. The UE of claim 11, wherein the polarization structure is at least one of a vertical-horizontal (V-H) polarization structure, a cross-polarization structure, a circular polarization structure, and an elliptical polarization structure.

* * * * *